United States Patent [19]

Cook

[11] Patent Number: 5,621,892
[45] Date of Patent: Apr. 15, 1997

[54] METHOD AND APPARATUS FOR MANAGING ALERTS AND EVENTS IN A NETWORKED COMPUTER SYSTEM

[75] Inventor: Colin Cook, Lindon, Utah

[73] Assignee: Intel Corporation, Santa Clara, Calif.

[21] Appl. No.: 541,493

[22] Filed: Oct. 10, 1995

[51] Int. Cl.⁶ .................................................. G06F 15/177
[52] U.S. Cl. ............................. 395/200.1; 395/200.01
[58] Field of Search ............................. 395/200.01, 200.1

[56] References Cited

U.S. PATENT DOCUMENTS

| | | | |
|---|---|---|---|
| 4,823,345 | 4/1989 | Daniel | 371/37.1 |
| 4,965,772 | 10/1990 | Daniel | 364/200.11 |
| 5,309,563 | 5/1994 | Farrand | 395/200 |
| 5,381,470 | 1/1995 | Cambray | 379/216 |
| 5,471,617 | 11/1995 | Farrand | 395/700 |
| 5,537,460 | 7/1996 | Holliday | 379/59 |
| 5,577,122 | 11/1996 | Schipper | 380/28 |

*Primary Examiner*—Eric Coleman
*Attorney, Agent, or Firm*—Blakely, Sokoloff, Taylor & Zafman

[57] ABSTRACT

An event management system for handling alerts and events in a computer system is disclosed. A server computer coupled to a network contains the event management software of the present invention. The event management software receives alerts sent by other computers on the network. Using a previously configured alert map with mapper and scheduler, the event management software dispatches service providers in response to the alerts received across the network or in response to the expiration of a timed event. An API is provided within each computer or device in which alerts can be generated. Using the standard interface definition, any of a wide variety of different alert types generated within the networked computers can be triggered and channeled through the network to the server where corresponding service providers are activated.

24 Claims, 9 Drawing Sheets

METHOD AND APPARATUS FOR MANAGING ALERTS AND EVENTS IN A NETWORKED COMPUTER SYSTEM

FIELD OF THE INVENTION

The present invention relates generally to the field of computer systems. Specifically, the present invention relates to the field of managing alerts and events in a computer system.

DESCRIPTION OF RELATED ART

Computers have long been capable of receiving and responding to various system conditions. Interrupts and interrupt handlers are one well-known technique for triggering a computer system response to a particular system event. In the lexicon of the present invention, the term "event" denotes any of a variety of synchronous or asynchronous occurrences or conditions that are of significance to a computer system or user. In the present specification, an event includes synchronous or timed events occurring on a regular or prescheduled basis. Synchronous events tend to be predictable in nature. The term "events" also includes asynchronous events, denoted herein as alerts, which occur unpredictably and arbitrarily throughout the operation of a computer system.

Prior art computer systems have typically implemented event management functionality as hard coded logic within the confines of a single computer. In this environment, the full set of events that may happen and need to be handled by this logic are typically well-known by the programmer at the time the software is designed and coded. It is therefore possible to hard code the handling of each event in this known set of events.

This prior art solution to event management, however, breaks down in distributed or networked computer systems, or when it is impractical to predefine all of the events that must be handled by the computer system at the time the software for the system is designed and coded. In distributed or networked computer systems, many different computers are tied together across a network. The various resources, configuration, and functionality provided by each of these computers on the network is not always known or predictable to other computers on the network. More particularly, all of the events that may occur on one distributed computer may not be known to the software executing on other computers of the distributed network. For this reason, the hard coded event manager of the prior art does not work well in a distributed network of computers.

Another drawback to the event managers of the prior art is their inherent lack of flexibility. Computers, especially personal computers, are sold in a large variety of different configurations. Many different input/output (I/O) devices may be coupled with a standard computer architecture. In addition, a large variety of software applications may be installed and used on a particular computer. Because this variety of hardware and software functionality generates a corresponding variety of different and variable events, it is desirable to have a flexible event manager that can easily be reconfigured for handling new events if new hardware or software functionality is added to the computer. Prior art systems have been unable to provide this flexibility.

Thus, a better means and method for managing events in a computer and in a network of computers is needed.

SUMMARY OF THE INVENTION

The present invention is a better means and method for managing events in a computer and in a network of computer systems. In the preferred embodiment, a server computer coupled to a network contains the event management software of the present invention. The event management software is responsible for receiving alerts sent by other computers or nodes coupled to the network. Using a previously configured alert map with mapper and scheduler, the event management software dispatches service providers in response to the alerts received across the network or in response to the expiration of a timed event. The service providers dispatched by the event management software may be any of a wide variety of services including a facsimile device, printing devices, electronic mail functionality, pager devices, or other devices coupled directly to network. In addition, these service providers may be coupled either to the server as server services or installed within or coupled to the network computers. As part of the preferred embodiment, the alert generator software includes a common interface definition (application programmer's interface -API). The API is provided within each computer or device in which alerts can be generated. Using the standard interface definition, any of a wide variety of different alert types generated within the networked computers can be triggered and channeled through the network to the server where corresponding service providers are activated.

It is therefore an advantage of the present invention that events are managed in a computer in a flexible and easily configured manner. It is a further advantage of the present invention that event generators and corresponding service providers may be registered in one computer from a different computer across a network. It is a further advantage of the present invention that a common application program interface is provided whereby the event manager of the present invention can be easily incorporated into a software package for execution on a computer. It is a further advantage of the present invention that multiple actions can be triggered in response to the receipt of a single event.

BRIEF DESCRIPTION OF THE DRAWINGS

The features and advantages of the present invention will be apparent from the accompanying drawings and from the detailed description of the present invention as set forth below.

DETAILED DESCRIPTION OF THE PREFERRED EMBODIMENT

The present invention is a better means and method for managing events in a computer and in a distributed network of computers. In the following detailed description, numerous specific details are set forth in order to provide a thorough understanding of the present invention. However, it will be apparent to one of ordinary skill in the art that these specific details need to be used to practice the present invention. In other instances, well-known structures, interfaces, and processes have not been shown in detail in order not to unnecessarily obscure the present invention.

Figure 1:
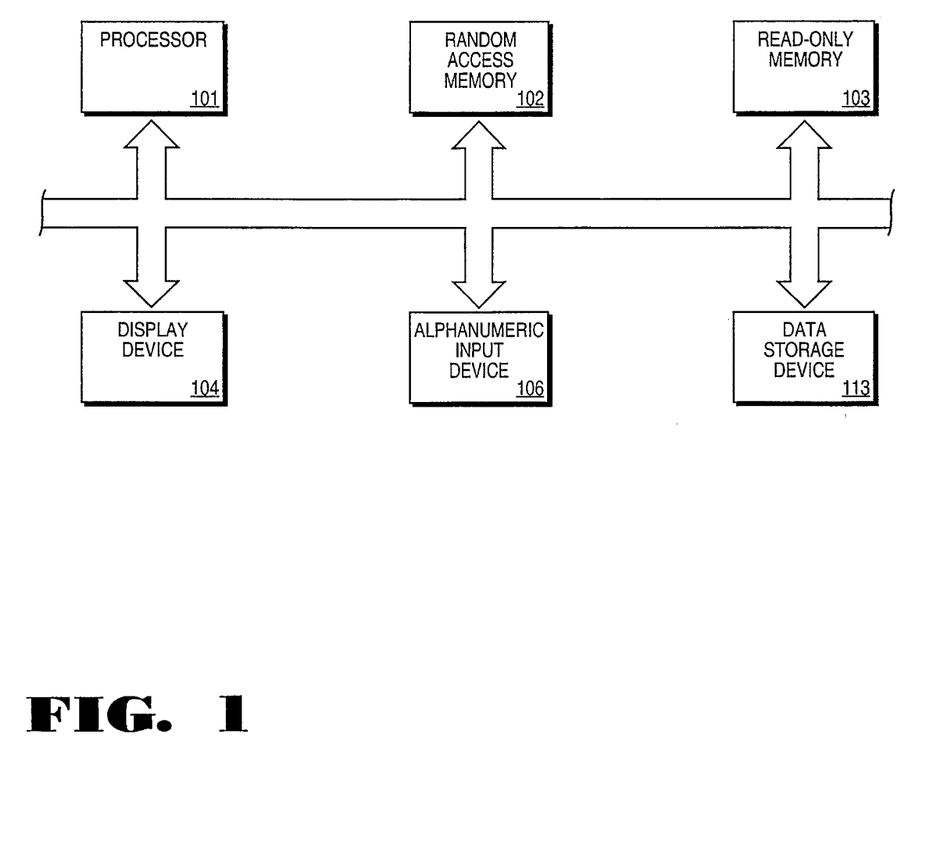
FIG. 1 illustrates the system hardware architecture of the computer of the present invention.

Referring now to FIG. 1, a typical computer system architecture in which the present invention operates is illustrated. The preferred embodiment of the present invention is implemented on an IBM™ PC computer manufactured by IBM Corporation of Armonk, N.Y. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, a random access memory 102 coupled with the bus 100 for storing information and instructions for the processor 101, a read-only memory 103 coupled with the bus 100 for storing static information and instructions for the processor 101, a display device 104 coupled with the bus 100 for displaying information for a computer user, an alphanumeric input device 106 coupled with the bus 100 for communicating information and command selections to the processor 101, and a data storage device 113, such as a magnetic disk and associated disk drive, coupled with the bus 100 for storing information and instructions.

Processor 101 may be any of a wide variety of general purpose processors or microprocessors such as the i486™ or Pentium™ brand microprocessor manufactured by Intel Corporation of Santa Clara, Calif. It will be apparent to those of ordinary skill in the art, however, that other varieties of processors may be used in a particular computer system. Display device 104 may be a liquid crystal device, cathode ray tube (CRT), or other suitable display device. Data storage device 113 may be a conventional hard disk drive, floppy disk drive, or other magnetic or optical data storage device for reading and writing information stored on a hard disk, a floppy disk, a magnetic tape, or other magnetic or optical data storage medium.

In general, processor 101 retrieves processing instructions and data from a data storage medium using data storage device 113 and downloads this information into random access memory 102 for execution. Processor 101, then executes an instruction stream from random access memory 102 or read-only memory 103. Command selections and information input at alphanumeric input device 106 are used to direct the flow of instructions executed by processor 101. The results of this processing execution are then displayed on display device 104.

The preferred embodiment of the present invention is a software based general purpose event management apparatus and method. In the preferred embodiment, the present invention comprises software and an interface architecture resident in and executed from random access memory 102. It will be apparent to those of ordinary skill in the art, however, that alternative embodiments of the same architecture may equivalently be implement.

Figure 2:
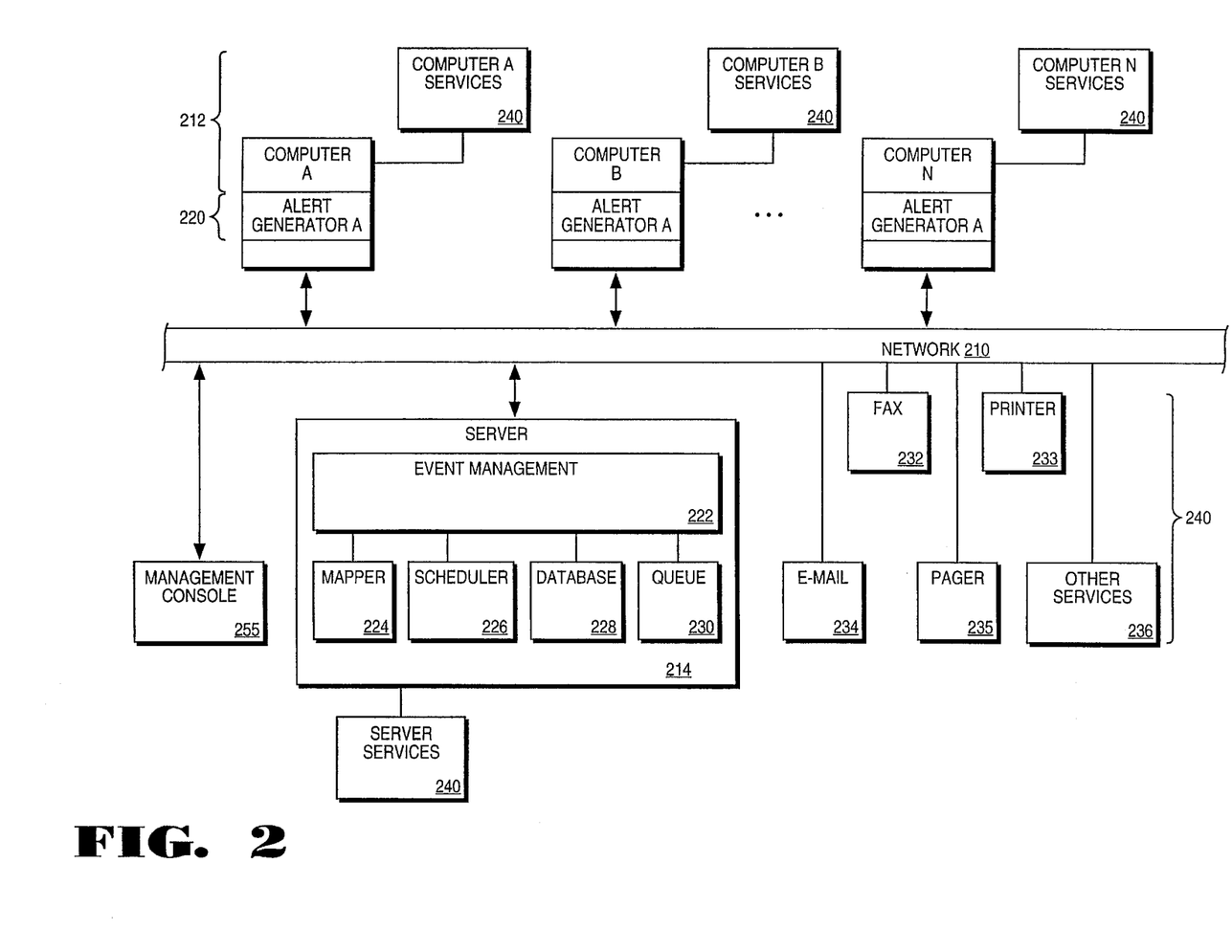
FIG. 2 illustrates the network environment in which the present invention operates.

Referring now to FIG. 2, the architecture of the network environment in which the present invention typically operates is illustrated. In the preferred embodiment, a server computer 214 coupled to a network 210 contains the event management software 222. The event management software 222 is responsible for receiving alerts sent by other computers or nodes 212, coupled to network 210. Using a previously configured alert map of mapper 224 and scheduler 226, event management software 222 dispatches service providers 240 in response to the alerts received across the network 210 or in response to the expiration of a timed event. The service providers 240 dispatched by the event management software 222 may be any of a wide variety of services including a facsimile device 232, printing devices 233, electronic mail functionality 234, pager devices 235, or other devices 236 coupled directly to network 210. In addition, these service providers may be coupled either to server 214 as server services 240 or installed within or coupled to network computers 212.

As part of the preferred embodiment, alert generator software including a common interface definition 220 is provided within each computer or device in which alerts can be generated. Using the standard interface definition, any of a wide variety of different alert types generated within computers 212 can be triggered and channeled through network 210 to server 214 where corresponding service providers are activated.

FIG. 2 also shows a management console 255 coupled to network 210. Console 255 is a computer system such as computer 212. In fact, one of computers 212 could be configured to act as a management console 255. Management console 255 executes a portion of software of the preferred embodiment which is used to configure portions of event management apparatus 222. Specifically, configuration software executing on console 255 is used to create, update, and view mappings between alerts and service providers as stored and maintained in mapper 224. The console 255 configuration software also provides means to display a listing or graphical representation of previously configured or logged alerts.

Figure 3:
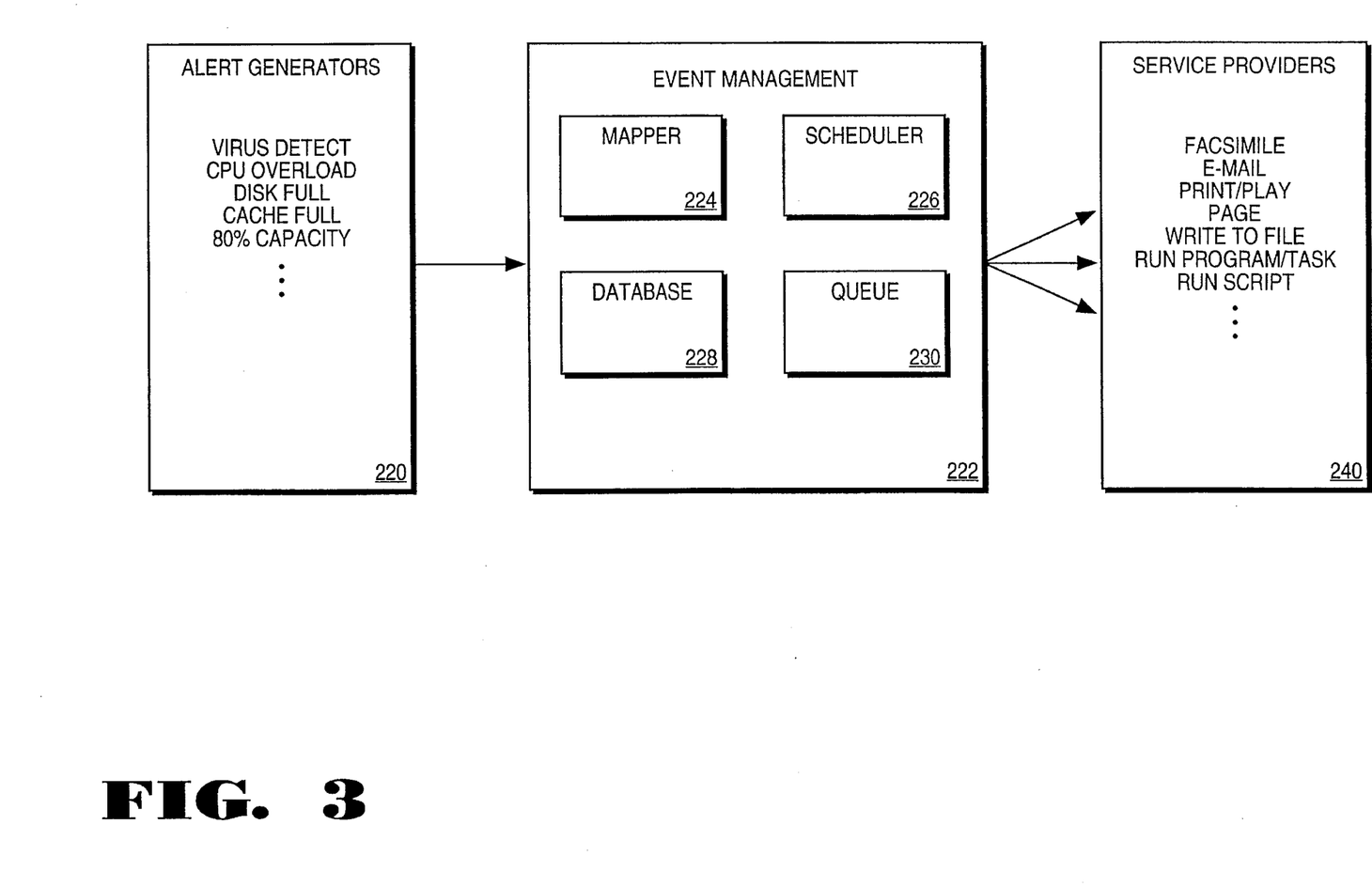
FIG. 3 illustrates the interconnection of the main elements of the present invention.

Referring now to FIG. 3, the logical interconnection between the alert generators 220 of computers 212 with event management software 222 of server 214 and the service providers 240 is illustrated. As shown, the alert types monitored within computers 212 includes a wide variety of alert types including a virus detection alert, a CPU overload alert, a disk full alert, a cache full alert, and 80% disk or processor utilization alert, and many other types of alerts in conventional computer systems as well known to those of ordinary skill in the art. Similarly, a wide variety of service providers 240 are available for responding to the alerts produced by alert generators 220. The service providers 240 include facsimile devices, electronic mail functionality, printers or magnetic recording devices, pagers, software modules for writing information to a file, software processes or tasks that may be executed in response to alerts, scripts that may be executed in response to an alert, and many other types of service providers as well known to those of ordinary skill in the art.

Event management software 222 is responsible for receiving alerts generated by alert generators 220 and for dispatching one or more corresponding service providers 240 in response to a particular alert. The correspondence between alerts and service providers is maintained by mapper 224 and configured using the management console 255 and the processing logic described in connection with FIGS. 5 through 9. In addition to alert handling, event management software 222 provides an interface through which timed events are configured using the management console 255 and scheduler 226. In this manner, service providers 240 are dispatched at predefined dates and times. Event management software 222 also provides a database 228 for storing a record of each alert received from alert generators 220. Using conventional techniques, the database 228 can be searched or queried for particular subsets of alerts that have been previously logged. Event management software 222 also includes a queue 230 for temporarily holding service provider execution requests if a particular service provider 240 cannot be immediately activated.

One advantage of the present invention is the flexible means by which alert generators and service providers may be installed in a particular system configuration. In the preferred embodiment of the present invention, event management software 222 exists as a network loadable module (NLM) on server 214. The user interface portion of alert generators 220 in computers 212 is implemented in the preferred embodiment as a Microsoft™ Windows DLL. The service providers 240 are implemented in the preferred embodiment as either Windows programs or NetWare™ NLMs. The use and operation of NLMs and DLLs is well known to those of ordinary skill in the art.

Figure 4:
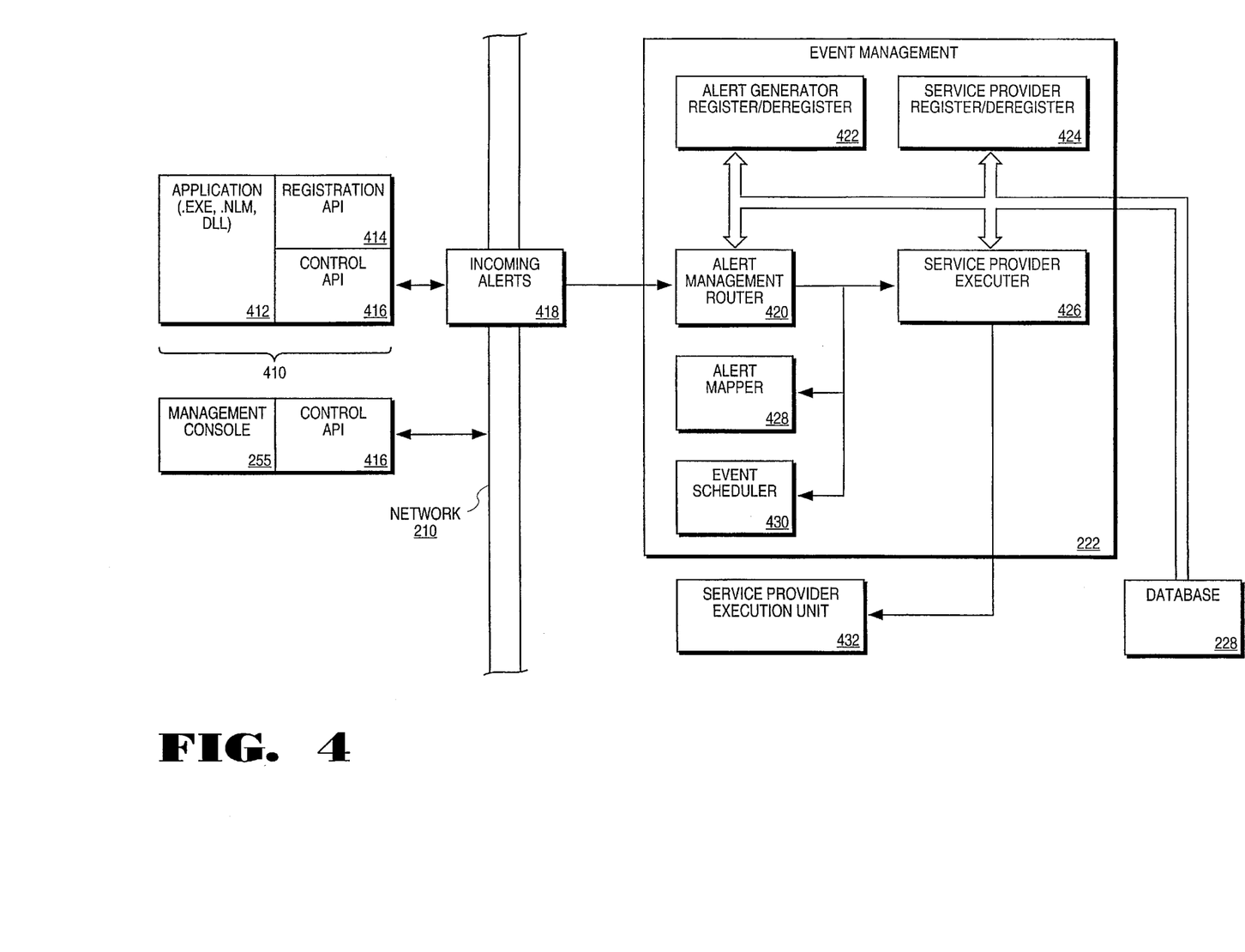
FIG. 4 illustrate the software architecture of the preferred embodiment.

Referring now to FIG. 4, a block diagram of the components of the preferred embodiment of the present invention are illustrated. Application programs 412 run on computers 212. In order for these application programs to process alerts, the registration application program interface 414 is provided with which application 412 may register alerts with the alert generator 422 of event management software 222. In addition, application 412 may use registration API 414 to register service providers available in application 412 or within the computer in which application 412 is operating. Registration API 414 also provides interfaces for registering timed events in alert generator 422. Once alerts, timed events, and service providers are registered by application 412, the application 412 may subsequently issue alert messages 418 across network 210 to event management software 222 via control API 416. Management console 255 also accesses event management software via control API 416. Management console 255 is used to configure a mapping between registered alerts and registered service providers. This mapping is maintained by alert mapper 428. Once a mapping is configured, a particular alert issued by a computer 410 and sent to event management software 222 triggers one or more service providers as defined by the mapping.

The alert management router 420 of event management software 222 receives the incoming alert messages and determines which service providers need to be activated in response to the incoming alert or timed event. The alert mapper 428, as configured by management console 255, is used to determine which service providers are associated with an incoming alert. The event scheduler 430 is used to determine if a timed event is ready for activation of a corresponding service provider. Once the service provider or service providers corresponding to the incoming alert message 418 is determined, the service provider executor 426 and the service provider execution unit 432 is activated to dispatch the appropriate service provider. If the requested service provider is not found on the network 210, other accessible computers are searched for equivalent functionality. For example, if an alert was configured to access a facsimile service provider but no such facsimile service provider is registered, the event management software will search other computers for a facsimile capability that may be used to respond to the alert. The incoming alert message 418 is also logged in database 228.

Figure 5:
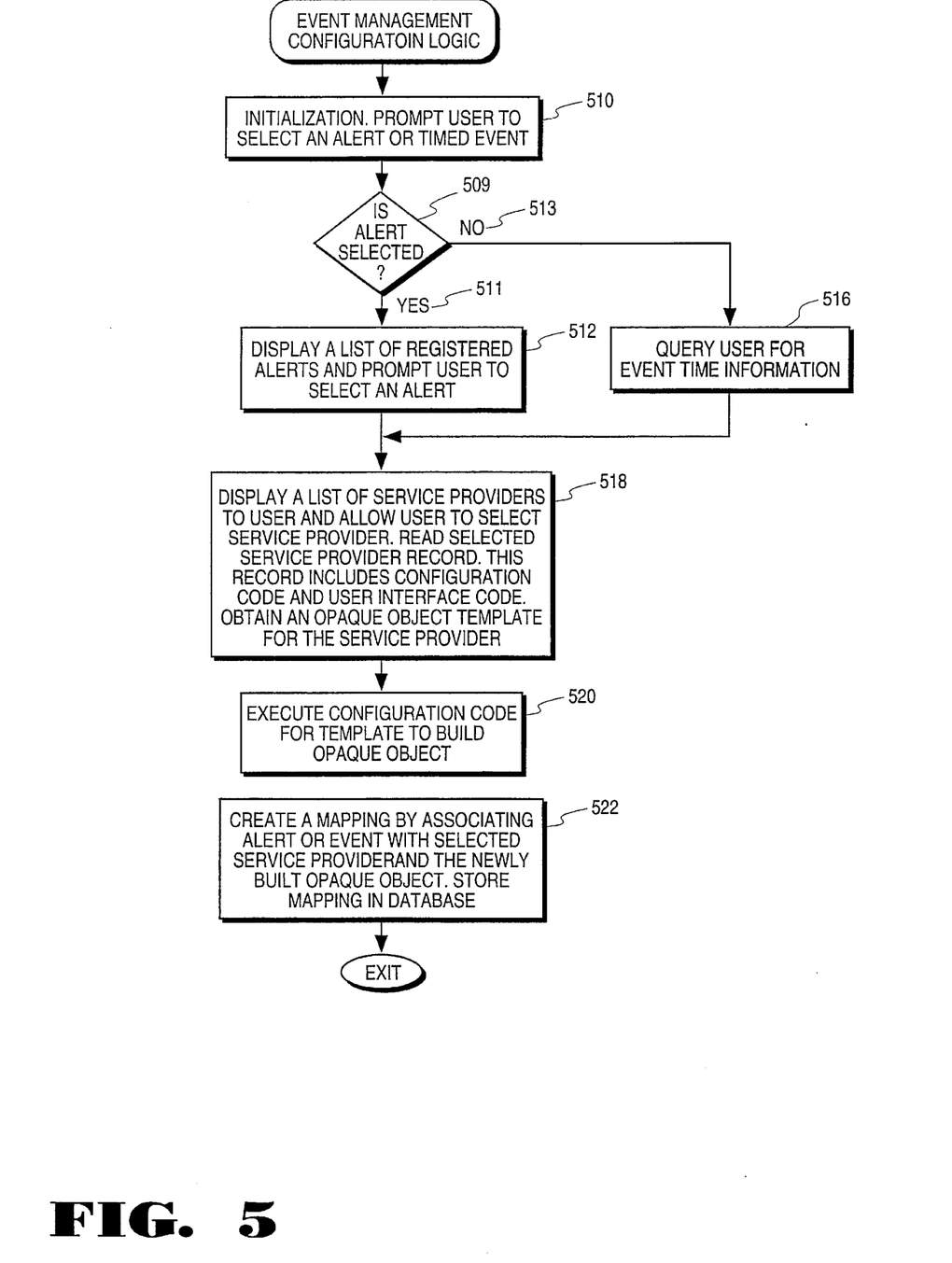
FIGS. 5, 6, 7, 8, and 9 are flow diagrams illustrating the processing logic of the present invention.
Figure 6:
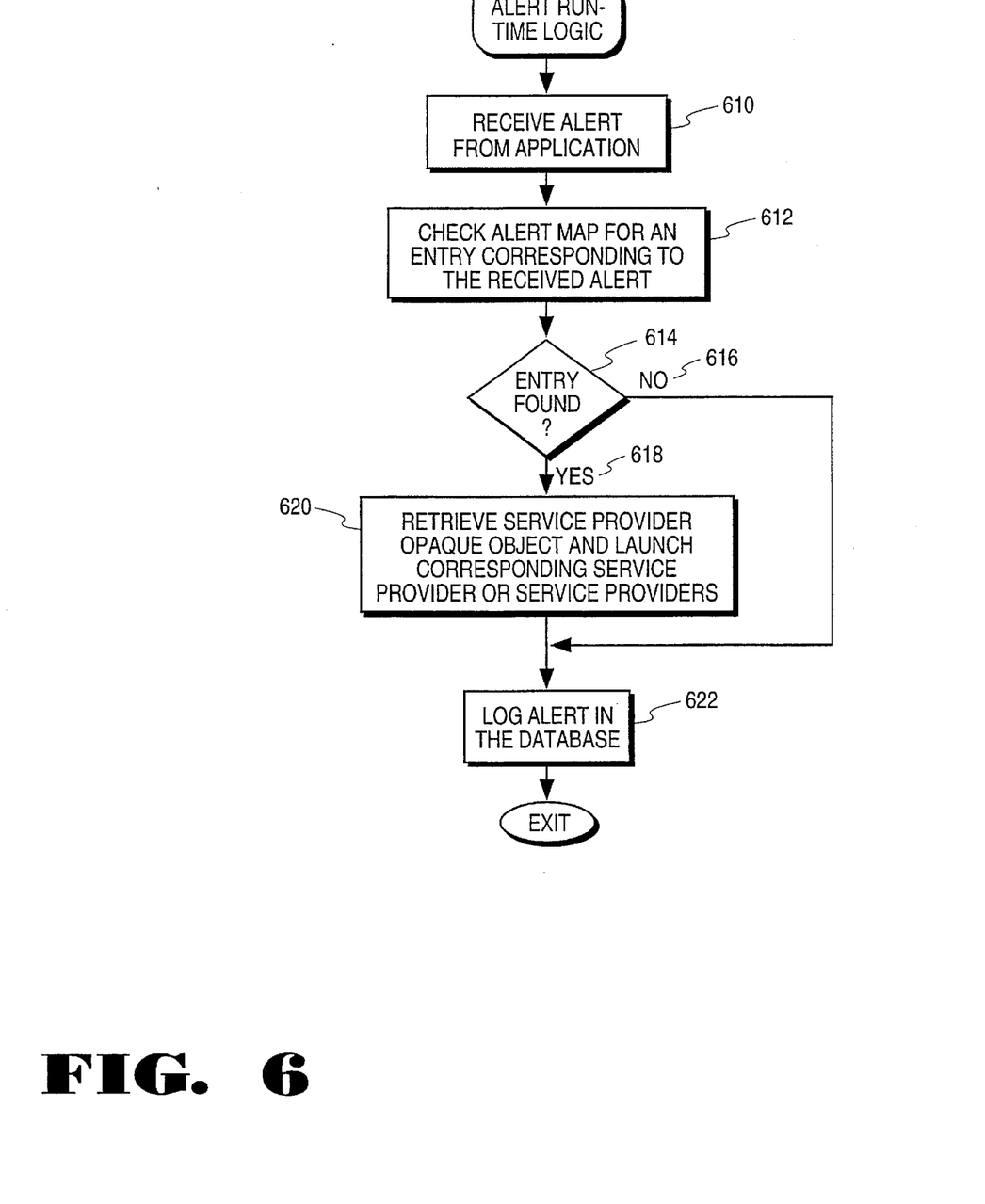
Figure 7:
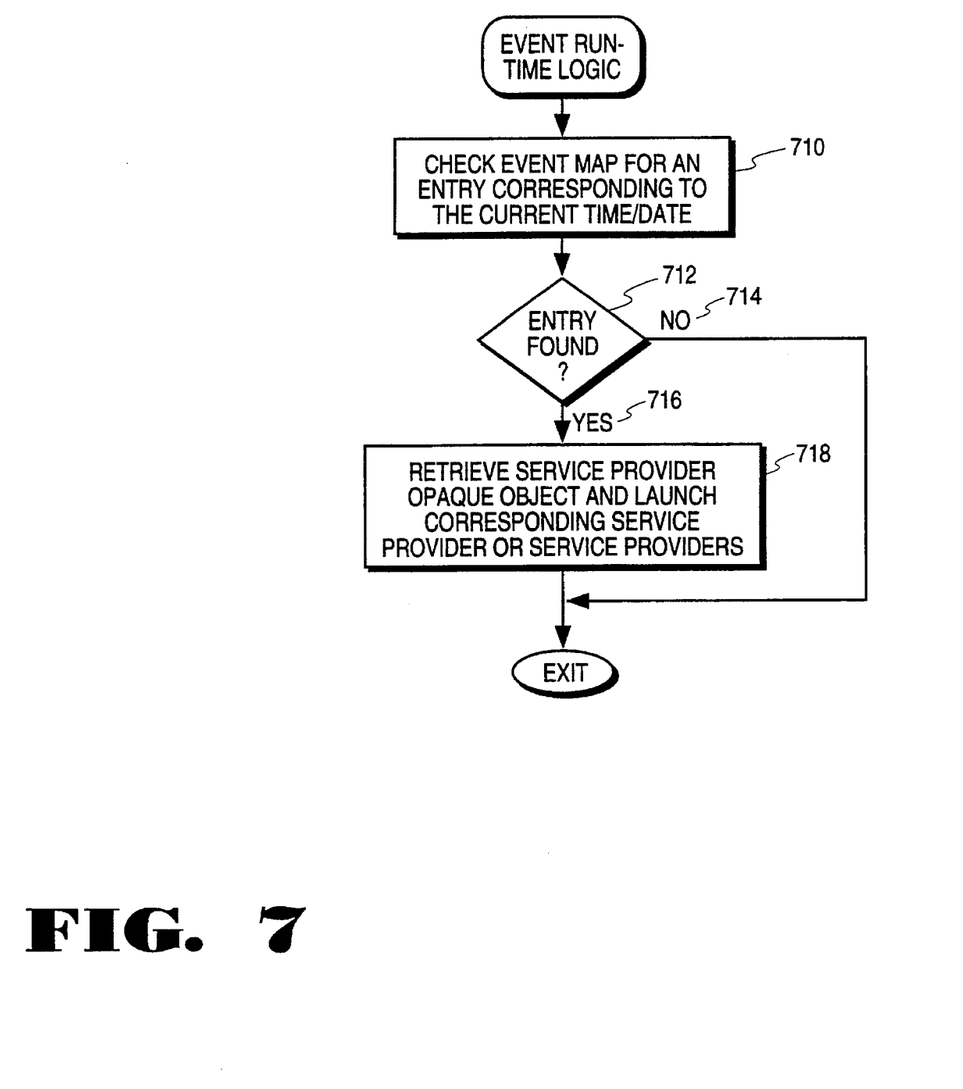
Figure 8:
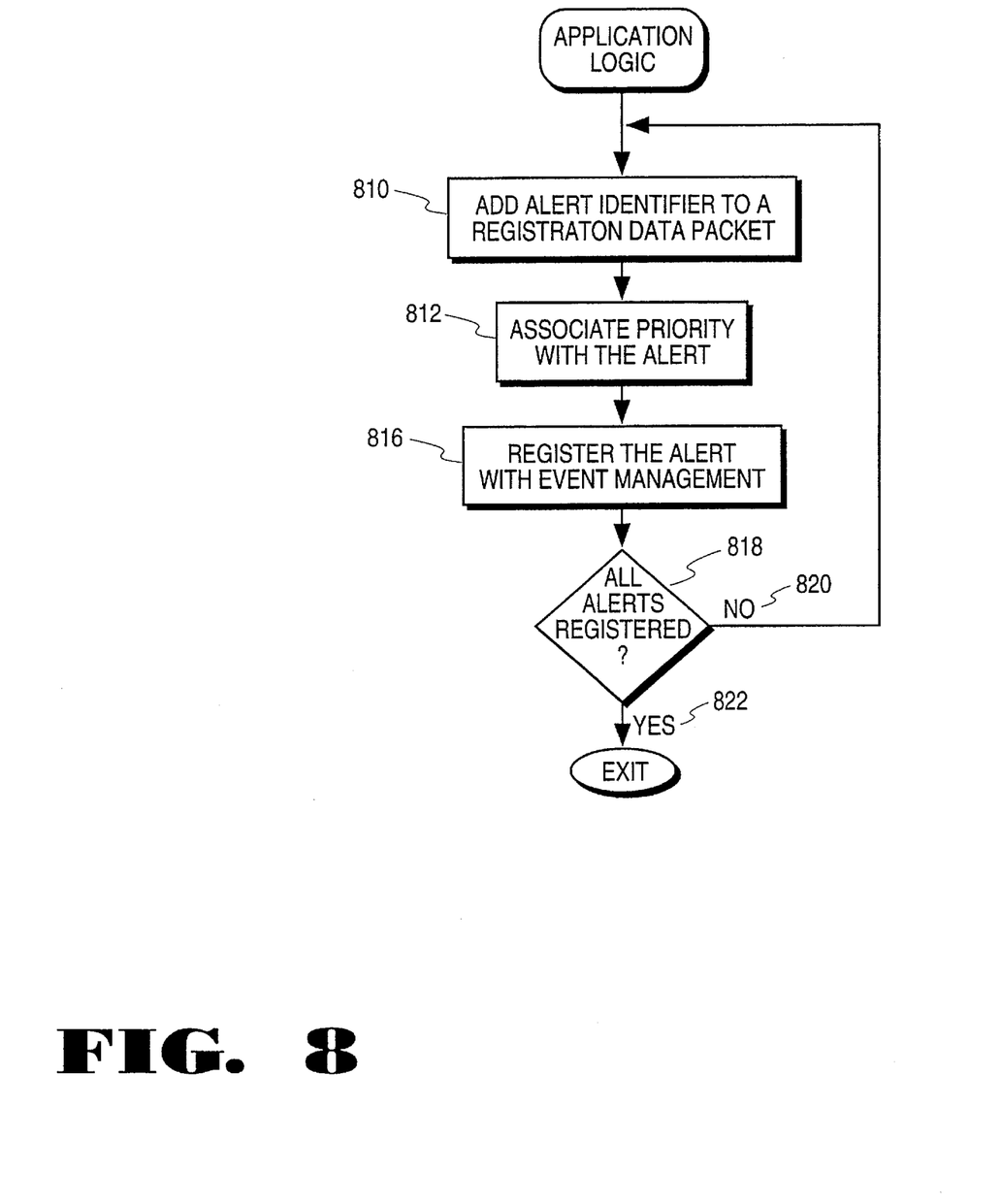
Figure 9:
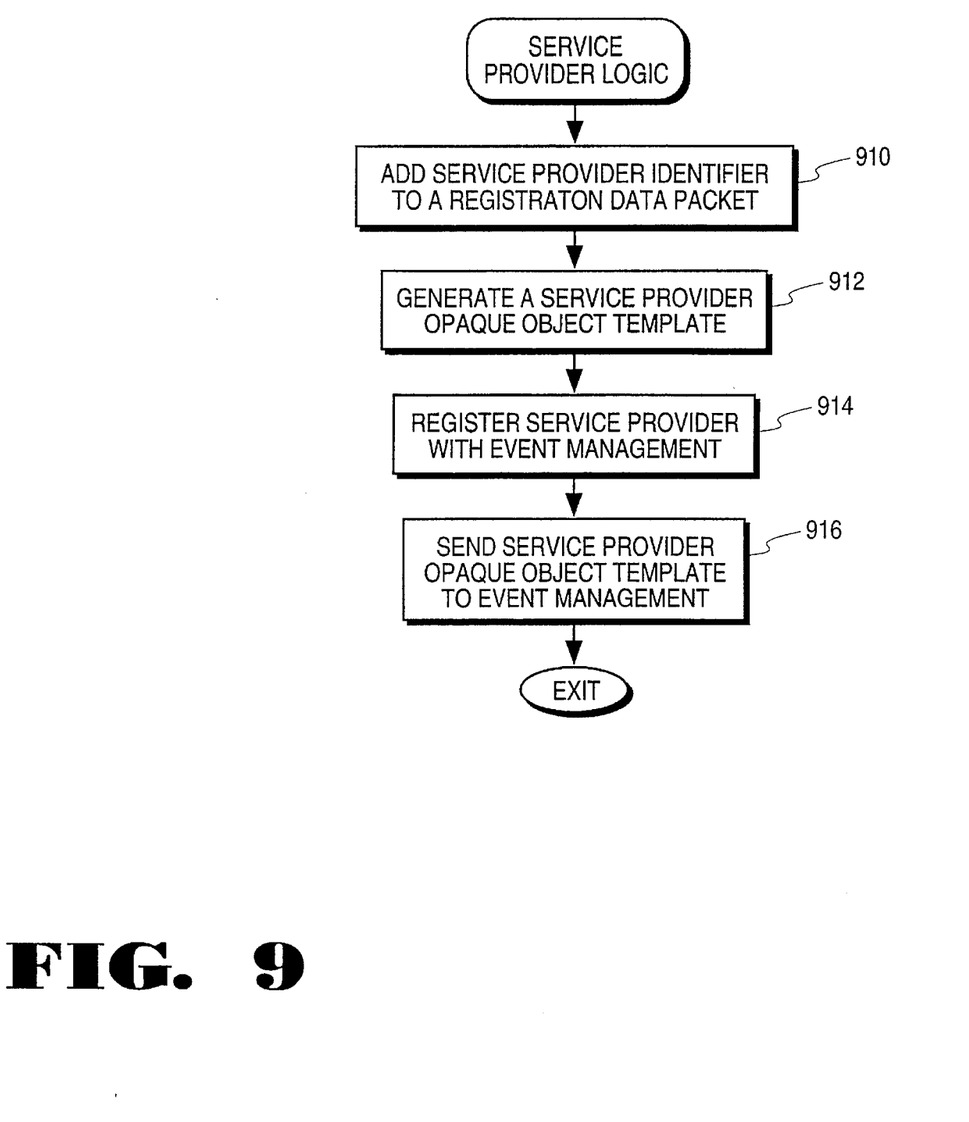

Referring now to FIGS. 5 through 9, flowcharts illustrate the processing performed by the preferred embodiment of the present invention. The processing logic of the present invention is logically partitioned into at least three portions. A first portion is executed as part of the application 414 resident on one of the computers 212. FIG. 8 illustrates the processing performed by this application resident program logic. FIG. 9 illustrates the processing logic performed by a service provider. The third component of the processing logic of the present invention is the event management software 222 executing with server 214. The processing logic for the event management software 222 is illustrated in FIGS. 5 through 7.

Referring now to FIG. 5, the registration and configuration logic of the event management software 222 is illustrated. The event management configuration logic is used to initially set up the registration and mappings between alerts or timed events and the corresponding service providers. This process starts after a standard initialization occurs in processing block 510. Once the event management logic is initialized, the user of a client is prompted for selection of either an alert or timed event. If the selection received in block 510 is an alert request, processing path 511 is taken to block 512 where the user is shown all previously registered alerts and is asked to select one of the displayed alerts. If the input record corresponding to the user selection received in block 510 is a timed event request (path 513), the user is queried for time information defining when the user would like the event to be triggered (block 516). This time information is obtained in block 516 and retained for later use.

In processing block 518, a list of previously registered service providers is displayed for a user to allow the user to select a service provider to be associated with the alert or event. The user then selects a service provider. The event management software reads the previously registered service provider record in block 518. This record includes the configuration software and the execution software corresponding to the selected service provider. In addition, an opaque object template is retrieved for the selected service provider. In block 520, the configuration software provided by the service provider is executed to build the opaque object from the opaque object template. The configuration software fills in particular information in portions of the opaque object. For example, the opaque object may be a facsimile transmittal form. The configuration software would, in this case, include logic for requesting the user to enter a facsimile telephone number or other facsimile information. It will be apparent to those of ordinary skill in the art that many other types of opaque objects may equivalently be used. Once the opaque object is built in block 520, a mapping is created for the alert or event and the selected service provider. This mapping includes an association between the alert or event, the selected service provider, and the newly built opaque object. For a timed event, the event time information is also included in the mapping. The mapping is used when an alert occurs to trigger the appropriate service provider and provide the service provider with the appropriate opaque object. Once this mapping is created in block 522, the mapping is stored in database 228 as shown in FIG. 4. Event management configuration logic then terminates at the exit bubble shown in FIG. 5.

The registration of alerts and service providers establishes the existence of alerts or events and service providers within the event management structure. The registered alerts and events are mapped with one or more corresponding service providers using mapper 224 in processing block 522. Mapping configuration requests originated by the management console 255, which could be one of the nodes on the network 210, are accepted by event management logic as shown in FIG. 5. The mapping configuration requests are used by the alert mapper 428 of the event management logic to identify the one or more service providers that are activated upon receipt of a corresponding alert. More than one such mapping can be maintained by alert mapper 428. In processing block 522, event map requests specifying a timed event, such requests being originated by the management console 255, are processed by the event management logic. The event management logic configures scheduler 226 to correspond to the timed events specified by the event map requests.

Referring now to FIG. 6, the alert run time logic of the event management software 222 is illustrated. In processing block 610, an incoming alert 418 is received from application 412 by the alert management router 420. The alert mapper 428 checks the alert map for an entry corresponding to the received incoming alert 418 in processing block 612. If a corresponding entry in the alert map is found, processing path 618 is taken to processing block 620 where the corresponding service provider or service providers are launched. In addition, the opaque object associated with the mapping is obtained and transferred to the corresponding service provider. The opaque object, as will be described in more detail herein, is a set of service provider specific information and/or executable code initially provided by the service provider when the service provider is registered and configured by service provider user interface code at the management console at the time a mapping is created. The event management software 222 merely retains this opaque object information and/or code until such time as the corresponding service provider is activated or configured. The event management software 222 is not aware of the content or structure of the information or code contained within the opaque object; however, the corresponding service provider is able to decode and use this information or code. Once the service providers corresponding to the incoming alert are launched in processing block 620, the alert is logged in database 228 in processing block 622. Alert run time processing then terminates as shown in FIG. 6.

Referring now to FIG. 7, the event run time logic of the event management software 222 of the present invention is illustrated. This logic is responsible for activating service providers in response to timed events configured by applications 412. In processing block 710, the event map is checked for an entry corresponding to a current time or date. If an entry is found, processing path 716 is taken to processing block 718 where the corresponding service or service providers are launched. Again, the opaque object corresponding to the map is transferred to the service providers in processing block 718. Processing for the event run time logic then terminates as shown in FIG. 7.

Referring now to FIG. 8, the processing logic contained within application 412 executing on one of the nodes 212 is illustrated. This application logic is also called herein alert generator logic. This application logic is responsible for registering and issuing the alerts associated with a particular application or a particular processing node. As described earlier, a registration API 414 and a control API 416 is provided to more easily facilitate incorporating this logic into an application. Once installed, the application logic first creates a set of alert registration packets starting in processing block 810. The alert identifier for each alert for a particular application is added to a registration packet. A priority associated with each alert is also provided in processing block 812. This priority may be associated with a severity of the alert. By way of example, the present invention includes four priority levels; 1) an information alert, 2) a normal condition alert, 3) a major condition alert, and 4) a critical condition alert. It will be apparent to one of ordinary skill in the art that additional levels of priority associated with alerts may equivalently be implemented. Once a priority is associated with the alert, the registration packet containing the alert registration information is sent from application 412 to alert generator 422 in event management software 222 (processing block 816). This process continues at decision block 818 until all the alerts associated with a particular application have been registered with event management software 222. Application logic then terminates through the exit bubble illustrated in FIG. 8. Subsequent to the registration process, the application may issue alerts at various points within execution of the application using the control API 416. The issuance of these alerts are processed as incoming alerts 418 as described above.

Referring now to FIG. 9, the processing logic performed by each service provider is illustrated. Each service provider is responsible for registering itself with the event management software 222 prior to being activated in response to an alert. The service provider identifier is added to a registration data packet in processing block 910. In addition, the registration data packet includes the type of service provider, the opaque object configuration code, and the service provider execution code. In processing block 912, a service provider opaque object template is created. The opaque object is a set of information and/or executable code usable by the service provider upon being activated in response to an alert. The template is an object with the same structure as the opaque object except the data portions of the template are not completely filled in yet. The event management software fills in these portions of the opaque object later by use of the configuration code provided as part of the service provider registration record. The information in the opaque object template is transferred to the event management software 222 and retained therein until the service provider is activated. Information provided by the service provider to the event management software 222 includes the identification of the service, executable code for activating the service provider, executable code for configuring the service provider, and other configuration information or data needed by the particular service provider. In processing block 914, the service provider registration data packet is sent to the event management software 222. The service provider opaque object template is also sent to event management software 222 in processing block 916. Processing for the service provider then terminates as illustrated in FIG. 9.

Thus, an apparatus and method for managing alerts and events in a computer system is disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. In a networked computer system having a plurality of nodes and a server coupled together on a network, a process for managing events in said networked computer system, said process comprising the steps of:

providing an event manager in said server;

registering an alert with said event manager;

registering one or more service providers with said event manager;

selectively mapping said alert to at least one of said service providers in a mapping;

receiving said alert from a node of said plurality of nodes, said event manager receiving said alert; and using said mapping to activate said at least one service provider in response to receipt of said alert.

2. The process as claimed in claim 1 further including the step of providing an application programmer's interface (API) in each of said plurality of nodes.

3. The process as claimed in claim 2 wherein said step of providing an application programmer's interface (API) in each of said plurality of nodes further includes the steps of:

providing a registration API in each of said plurality of nodes; and providing a control API in each of said plurality of nodes.

4. The process as claimed in claim 1 wherein said step of selectively mapping further includes the step of configuring an alert map of said event manager, said step of configuring further includes the steps of creating a mapping between alerts and service providers, updating a mapping between alerts and service providers, and displaying a mapping between alerts and service providers.

5. The process as claimed in claim 4 wherein said step of configuring further includes a step of providing a management console coupled to said network, said management console including a control API.

6. The process as claimed in claim 1 wherein said one or more service providers includes a facsimile device.

7. The process as claimed in claim 1 wherein said one or more service providers includes a device having electronic mail functionality.

8. The process as claimed in claim 1 further including a step of generating an alert in response to an asynchronous event occurring in one of said plurality of nodes.

9. The process as claimed in claim 1 further including a step of generating an alert in response to a timed event.

10. The process as claimed in claim 1 further including a step of activating a plurality of service providers in response to a single alert.

11. In a networked computer system having a plurality of nodes and a server coupled together on a network, an apparatus for managing events in said networked computer system, said apparatus comprising:

means for providing an event manager in said server;

means for registering an alert with said event manager;

means for registering one or more service providers with said event manager;

means for selectively mapping said alert to at least one of said service providers in a mapping;

means for receiving said alert from a node of said plurality of nodes, said event manager receiving said alert; and means for using said mapping to activate said at least one service provider in response to receipt of said alert.

12. The apparatus as claimed in claim 11 further including an application programmer's interface (API) in each of said plurality of nodes.

13. The apparatus as claimed in claim 12 wherein said application programmer's interface (API) in each of said plurality of nodes further includes:

a registration API in each of said plurality of nodes; and a control API in each of said plurality of nodes.

14. The apparatus as claimed in claim 11 wherein said means for selectively mapping further includes means for configuring an alert map of said event manager, said means for configuring further includes means for creating a mapping between alerts and service providers, means for updating a mapping between alerts and service providers, and means for displaying a mapping between alerts and service providers.

15. The apparatus as claimed in claim 14 wherein said means for configuring further includes a management console coupled to said network, said management console including a control API.

16. The apparatus as claimed in claim 11 wherein said one or more service providers includes a facsimile device.

17. The apparatus as claimed in claim 11 wherein said one or more service providers includes a device having electronic mail functionality.

18. The apparatus as claimed in claim 11 further including means for generating an alert in response to an asynchronous event occurring in one of said plurality of nodes.

19. The apparatus as claimed in claim 11 further including means for generating an alert in response to a timed event.

20. The apparatus as claimed in claim 11 further including means for activating a plurality of service providers in response to a single alert.

21. An apparatus for managing events in a network having a plurality of nodes coupled to a server, comprising:

an event manager located within said server;

an alert manager coupled to said event manager and capable of registering an alert with said event manager;

a service provider manager coupled to said event manager and capable of registering a service provider with said event manager;

a mapping manager coupled to said event manager and capable of associating a particular alert with a particular service provider;

an alert manager coupled to said event manager and capable of receiving said alert; and a service provider executer coupled to said event manager and capable of activating a service provider associated with said alert.

22. The apparatus as claimed in claim 21 further including a management console coupled to said event manager.

23. The apparatus as claimed in claim 21 further including a scheduler coupled to said event manager and capable of generating an event in response to a timed event.

24. The apparatus as claimed in claim 21 further including an application programmer's interface (API) in each of said plurality of nodes.

* * * * *